Patented Aug. 9, 1932

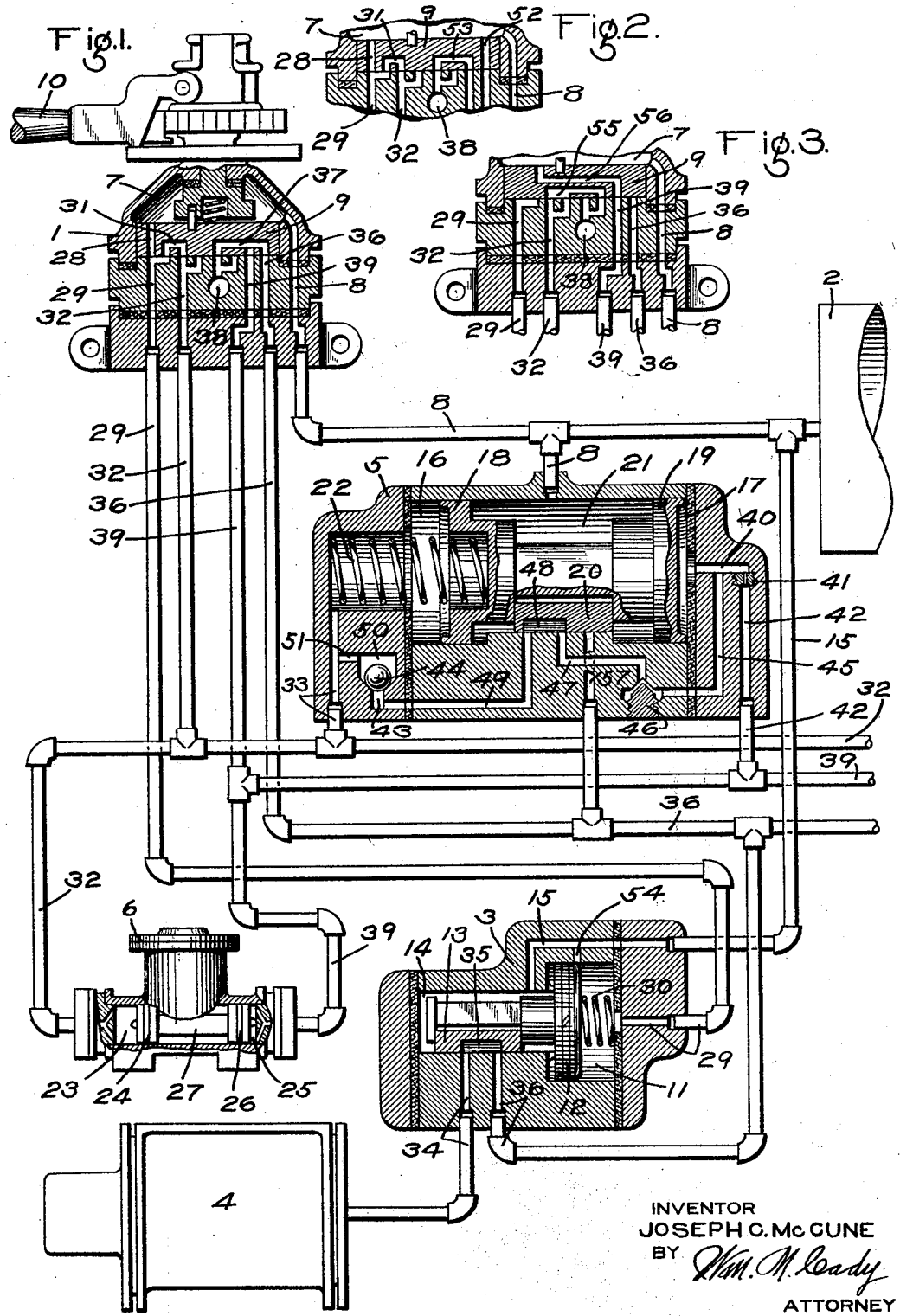

1,870,861

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKE AND DOOR INTERLOCK

Application filed May 16, 1929. Serial No. 363,482.

This invention relates to vehicle door and brake controlling means and more particularly to safety car control equipment in which fluid under pressure is supplied to the brake cylinder when the car door is open.

The principal object of my invention is to provide an improved safety car control equipment of the above type, which, when the car door is opened, will prevent the supply of fluid under pressure to the brake cylinder for a predetermined period of time after the opening of the car door has been initiated.

Another object of my invention is to provide an improved safety car control equipment of the above type which is operative to prevent a full service application of the brakes from being effected upon the opening of the car door until a predetermined period of time has elapsed.

Other objects and advantages will appear in the following more detailed description of my invention.

In the accompanying drawing; Figure 1 is a diagrammatic view, mainly in section, of a portion of a safety car control equipment embodying my invention, the brake valve device being shown in release position; Figure 2 is a diagrammatic sectional view showing the brake valve device in service position; and Figure 3 is a view similar to Fig. 2 but showing the brake valve device in service door open position.

As shown in the accompanying drawing, the safety car control equipment may comprise a brake valve device 1, a main reservoir 2, an emergency valve device 3, a brake cylinder 4, a door interlock valve device 5 and a door engine 6.

The brake valve device 1 may comprise a casing having a chamber 7 constantly connected to the main reservoir 2 through pipe and passage 8 and containing a rotary valve 9 which is operated by a handle 10.

The emergency valve device 3 may comprise a casing having a chamber 11 containing an emergency piston 12 which is adapted to operate an emergency slide valve 13 contained in a chamber 14 which is constantly connected to the main reservoir 2 through a passage and pipe 15.

The door interlock valve device may comprise a casing having chambers 16 and 17 containing pistons 18 and 19 respectively which are connected together and which are adapted to operate a slide valve 20 contained in a chamber 21 constantly connected to the main reservoir 2 through the pipe 8. Also contained in the piston chamber 16 and interposed between and engaging the casing and the piston 18, is a spring 22, the pressure of which normally maintains the pistons and slide valve 20 in their right hand positions as shown in Fig. 1 of the drawing.

The door engine 6 may comprise a casing having a door closing piston chamber 23 containing a door closing piston 24 and also having a door opening piston chamber 25 containing a door opening piston 26, said pistons being connected together by a bar 27 and adapted to operate the car door (not shown) in the usual manner.

With the brake valve device 1 in release position as shown in Fig. 1 of the drawing, fluid under pressure supplied to the main reservoir 2 flows to the slide valve chamber 21 in the door interlock valve device 5 and chamber 7 in the brake valve device 1, through pipe and passage 8. From the chamber 7 fluid under pressure flows to the emergency piston chamber 11 through a port 28 in the rotary valve 9 and passages and pipe 29.

From the main reservoir 2 fluid under pressure flows to the emergency slide valve chamber 14 through pipe 8, and pipe and passage 15, and since the pressures in the emergency piston chamber 11 and valve chamber 14 are substantially equal, the pressure of a spring 30, contained in the piston chamber 11, maintains the emergency valve device in its normal position, as shown in Fig. 1, for effecting a service application and the release of the brakes.

From the passage 29, fluid under pressure flows to the door closing piston chamber 23 in the door engine 6 by way of a cavity 31 in the rotary valve 9 of the brake valve device, and door closing passage and pipe 32, and from the pipe 32, fluid under pressure also flows to the piston chamber 16 in the door interlock valve device 5 through a branch pipe and passage 33.

Further, with the brake valve device in release position, the brake cylinder 4 is vented to the atmosphere through a pipe and passage 34, a cavity 35 in the emergency slide valve 13, a passage and pipe 36, a cavity 37 in the rotary valve 9 of the brake valve device and atmospheric passage 38.

The door opening piston chamber 25 in the door engine 6 is vented to the atmosphere by way of a door opening pipe and passage 39, cavity 37 in the rotary valve 9 and passage 38, and the piston chamber 17, in the door interlock valve device 5, is vented to the atmosphere through a passage 40, a choke plug 41, a passage and pipe 42 and door opening pipe 39.

With the door opening piston chamber 25, in the door engine, thus vented, and the door closing piston chamber 23 supplied with fluid under pressure, the pistons 24 and 26 will be maintained in their door closing positions, as shown in Fig. 1. With the piston chamber 17 in the door interlock valve device 5 vented, the pressure of the fluid supplied to the piston chamber 16 and the pressure of the spring 22 maintains the pistons 18 and 19 and the slide valve 20 in their right hand positions as shown in Fig. 1.

With the door interlock slide valve 20 in this position, the passage 40 is connected to a chamber 43 at the underside of a ball check valve 44, by way of a passage 45, past a tapered choke plug 46 having screw-threaded connection with the casing of the door interlock valve device, a passage 47, a cavity 48 in the door interlock slide valve 20 and a passage 49. The ball check valve 44 is contained in a chamber 50 which is constantly connected to the passage 33 through a passage 51. Since the chamber 43 is vented, the ball check valve 44 will be seated, thus preventing the flow of fluid under pressure from the passage 33 to the passage 39.

To effect a service application of the brakes the brake valve device 1 is operated to service position, as shown in Fig. 2 of the drawing, in which, fluid under pressure is supplied from the chamber 7 in the brake valve device to the brake cylinder 4 by way of a port 52 in the rotary valve 9, passage and pipe 36, cavity 35 in the emergency slide valve 13 and passage and pipe 34.

With the brake valve device in this position the door closing piston chamber 23 in the door engine 6 and the piston chamber 16 in the door interlock valve device, emergency piston chamber 11 and emergency slide valve chamber 14 are maintained charged with fluid under pressure in the same manner as when the brake valve device is in release position. The door opening piston chamber 25 and the piston chamber 17 in the door interlock valve device are maintained vented by way of the door opening pipe and passage 39, a cavity 53 in the rotary valve 9 and passage 38.

When it is desired to open the car door, the brake valve device is operated to service door open position, as shown in Fig. 3, in which position, the rotary valve 9 closes off the further supply of fluid under pressure to the emergency piston chamber 11 through the brake valve device, there being a passage 54 in the emergency valve device casing, through which fluid under pressure is supplied from the passage 15 to the chamber 11, thus the pressures on both sides of the emergency piston will be equalized and the emergency valve device will be maintained in service position by the pressure of the spring 30.

With the rotary valve in this position the door closing piston chamber 23 of the door engine is vented to the atmosphere through pipe and passage 32, a cavity 55 in the rotary valve 9 and passage 38. The piston chamber 16 in the door interlock valve device 5 is also vented to the atmosphere through passage and pipe 33 and pipe 32.

Further with the rotary valve 9 in this position, fluid under pressure is supplied to the door opening piston chamber 25 in the door engine through a port 56 in the rotary valve 9 and door opening passage and pipe 39. Fluid under pressure from the pipe 39 flows to the piston chamber 17 in the door interlock valve device 5 through pipe and passage 42, choke plug 41 and passage 40, and from the passage 40 fluid under pressure is vented through passage 45, past the tapered choke plug 46, through passage 47, and cavity 48 in the slide valve 20 of the door interlock valve device, and from said cavity, preferably through passage 49 past the ball check valve 44, through chamber 50 and passage 51 and from thence to the atmosphere by way of passage and pipe 33, pipe 32 and the brake valve device 1.

The flow of fluid under pressure through the atmospheric connection from the passage 40 to the atmosphere is at a slower rate than the rate at which fluid under pressure is supplied to the passage 40 and piston chamber 17 in the door interlock valve device, so that the pressure of fluid in the piston chamber 17 will build up slowly, the rate of the flow of fluid through the atmospheric connection being determined by the flow area past the tapered choke plug 46. Fluid under pressure vented into the passage 33 from the passage 40 retards, to some extent, the drop in pressure in the piston chamber 16 in the door interlock valve device. Now as the pressure reduces in the piston chamber 16 and slowly increases in the piston chamber 17, the door interlock pistons 18 and 19 and slide valve 20 are caused to move slowly in the direction toward the left hand against the pressure of the spring 22 and the pressure of fluid which may be present in the piston chamber 16. As the slide valve 20 is thus moved, it gradually closes off the flow of fluid through the passage 47 and eventually entirely closes off such flow so that the pressure of fluid builds up more rapidly in the chamber 17 and causes the pistons 18 and 19 to operate to move the slide valve 20 to its extreme left hand position, uncovering a passage 57 connected to the pipe 36, so that fluid under pressure from the main reservoir 2 is supplied to the brake cylinder 4 through pipe 8, valve chamber 21 in the door interlock valve device, past the end of the slide valve 20, through passage 57, pipe and passage 36, cavity 35 in the emergency slide valve 13 and passage and pipe 34, thus effecting an application of the brakes.

It will be noted that when the brake valve is operated to service door open position the door will be caused to open and after a predetermined period of time has elapsed, a full service application of the brakes is effected, the duration of said period being dependent upon the rate of build up of pressure on the face of the piston 19 of the door interlock valve device, as governed by the rate of the flow of fluid through the choke plug 41 and the rate of the flow of fluid to the atmosphere past the choke plug 46, which choke plug is adapted to be adjusted to vary the rate of the flow of fluid thereapast and consequently vary the duration of the period of time between the opening of the car door and the effecting of a full service application of the brakes and maintaining the brakes applied while the door is open.

Should the operator, in bringing the car to a stop, misjudge the speed of the car, and operate the brake valve device to service door open position before the speed of the car has been reduced sufficiently, the door interlock valve device will operate to prevent a full service application of the brakes from being effected until a predetermined time period has elapsed, thus permitting the speed of the car to be further reduced without an increase in the pressure of fluid in the brake cylinder, which results in the gentle stopping of the car. If the door interlock valve device should be permitted to operate to supply fluid under pressure to the brake cylinder immediately upon the operation of the brake valve device to service door open position, a full service application of the brakes would be effected which would result in the harsh stopping of the car, which is very objectionable.

To close the door and release the brake, the brake valve device is operated to release position, in which, the door closing piston chamber 23 is again supplied with fluid under pressure and the door opening piston chamber 25 is vented to the atmosphere, and the piston chamber 16 in the door interlock valve device is again supplied with fluid under pressure and the piston chamber 17 vented to the atmosphere. Fluid under pressure thus supplied to the piston chamber 16, together with the pressure of the spring 22, causes the door interlock valve device to operate to its extreme right hand position as shown in Fig. 1, in which position, the cavity 48 in the slide valve 20 again establishes communication from the passage 40 to the passage 33, the ball check valve 44 preventing the flow of fluid from the passage 33 to the passage 40 and piston chamber 17.

With the brake valve device in release position, fluid under pressure from the brake cylinder 4 flows to the atmosphere through pipe and passage 34, cavity 35 in the emergency slide valve 13, passage and pipe 36, cavity 37 in the rotary valve 9 of the brake valve device and passage 38.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a fluid pressure brake equipment and door controlling means for a vehicle, of a brake cylinder forming part of said equipment, and slow acting means cooperating with said fluid pressure brake equipment and said door controlling means operative automatically after the opening of the vehicle door is initiated for supplying fluid under pressure to the brake cylinder, said slow acting means being set in operation upon the initiation of the opening of said door.

2. The combination with a fluid pressure brake equipment and door controlling means for a vehicle, of a brake cylinder forming part of said equipment, a fluid pressure supply source, and slow acting means cooperating with said fluid pressure brake equipment and said door controling means operative automatically after the opening of the vehicle door is initiated for establishing communication from said fluid pressure supply source to the brake cylinder, said slow acting means being set in operation upon the initiation of the opening of said door.

3. The combination with a fluid pressure brake equipment and door controlling means for a vehicle, of a brake cylinder forming part of said equipment, slow acting means cooperating with said fluid pressure brake equipment and said door controlling means operative automatically to supply fluid under pressure to the brake cylinder after the opening of the vehicle door is initiated, and means for governing the time at which the slow acting means operates to supply fluid under pressure to the brake cylinder.

4. The combination with a fluid pressure brake equipment and door controlling means for a vehicle, of a brake cylinder forming part of said equipment, slow acting pressure sensitive means cooperating with said fluid pressure brake equipment and said door controlling means set in operation automatically upon the opening of the vehicle door for supplying fluid under pressure to the brake cylinder, and means for governing the operation of said pressure sensitive means to delay the supplying of fluid under pressure to the brake cylinder for a predetermined period of time after the opening of the vehicle door has been initiated.

5. The combination with a fluid pressure brake equipment for a vehicle, of means for controlling the opening of the vehicle door, and slow acting means set in operation automatically upon the opening of the door being initiated to cause said equipment to operate to effect an application of the brakes at a predetermined time after the opening of the door has been initiated.

6. In a fluid pressure brake and door controlling equipment for a vehicle, the combination with a brake cylinder, of a door engine operative by fluid under pressure to open the vehicle door, valve means operative by fluid under pressure to supply fluid under pressure to the brake cylinder to effect an application of the brakes, a valve device operative to supply fluid under pressure to the door engine and to said valve means, and means for retarding the action of said valve means to supply fluid under pressure to the brake cylinder.

7. In a fluid pressure brake and door controlling equipment for a vehicle, the combination with a brake cylinder, of a door engine operative by fluid under pressure to open the vehicle door, slow acting valve means operative by fluid under pressure to supply fluid under pressure to the brake cylinder to effect an application of the brakes, a valve device operative to supply fluid under pressure to the door engine and to said valve means, and means for governing the action of said valve means to delay the supplying of fluid under pressure to the brake cylinder for a predetermined period of time.

8. In a fluid pressure brake and door controlling equipment for a vehicle, the combination with a brake cylinder, of a door engine operative by fluid under pressure to open the vehicle door, valve means operative by fluid under pressure to supply fluid under pressure to the brake cylinder to effect an application of the brakes, a valve device operative to supply fluid under pressure to the door engine and to said valve means, means for retarding the action of said valve means to delay, for a predetermined period of time, the supplying of fluid under pressure to the brake cylinder, and means adjustable to vary the duration of said period of time.

9. In a fluid pressure brake and door controlling equipment for a vehicle, the combination with a brake cylinder, of a door engine operative by fluid under pressure to open the vehicle door, valve means operative by fluid under pressure to supply fluid under pressure to the brake cylinder to effect an application of the brakes, a valve device operative to supply fluid under pressure to the door engine and to said valve means, means for retarding the action of said valve means to delay, for a predetermined period of time, the supplying of fluid under pressure to the brake cylinder, and a choke plug adjustable to vary the duration of said period of time.

10. In a fluid pressure brake and door controlling equipment for a vehicle, the combination with a brake cylinder, of a door engine operative by fluid under pressure to open the vehicle door, a valve operative to supply fluid under pressure to said brake cylinder, a piston subject to the pressure of fluid for operating said valve, a valve device operative to one position to supply fluid under pressure to said door engine to effect the opening of the vehicle door and to supply fluid under pressure to the face of said piston to operate said valve, and means for retarding the build up of pressure on the face of said piston.

11. In a fluid pressure brake and door controlling equipment for a vehicle, the combination with a brake cylinder, of a door engine operative by fluid under pressure to open the vehicle door, a valve operative to supply fluid under pressure to said brake cylinder, a piston subject to the pressure of fluid for operating said valve, a valve device operative to one position to supply fluid under pressure to said door engine to effect the opening of the vehicle door and to supply fluid under pressure to the face of said piston to operate said valve, and means for venting fluid under pressure from the face of said piston at a slower rate than it is being supplied to said face.

12. In a fluid pressure brake and door controlling equipment for a vehicle, the combination with a brake cylinder, of a door engine operative by fluid under pressure to open the vehicle door, a valve operative to supply fluid under pressure to said brake cylinder, a piston subject to the pressure of fluid for operating said valve, a valve device operative to one position to supply fluid under pressure to said door engine to effect the opening of the vehicle door and to supply fluid under pressure to the face of said piston to operate said valve, means for venting fluid under pressure from the face of said piston at a slower rate than it is being supplied to said face, and means adjustable to vary the rate of the flow of fluid from the face of said piston.

13. In a fluid pressure brake and door controlling equipment for a vehicle, the combination with a brake cylinder, of a door engine operative by fluid under pressure to open the vehicle door, a valve operative to supply fluid under pressure to said brake cylinder, a piston subject to the pressure of fluid for operating said valve, a valve device operative to one position to supply fluid under pressure to said door engine to effect the opening of the vehicle door and to supply fluid under pressure to the face of said piston to operate said valve, and means for venting fluid under pressure from the face of said piston at a slower rate than it is being supplied to said face to delay the operation of said valve to a position to supply fluid under pressure to the brake cylinder, said valve, when in position to supply fluid under pressure to the brake cylinder, closing communication through which fluid is vented from the face of said piston.

In testimony whereof I have hereunto set my hand, this 13th day of May, 1929.

JOSEPH C. McCUNE.